(12) United States Patent
Steege et al.

(10) Patent No.: US 9,715,610 B2
(45) Date of Patent: *Jul. 25, 2017

(54) SYSTEM FOR TRACKING BICYCLE COMMUTER ACTIVITY

(71) Applicant: Everlast Climbing Industries, Inc., Mendota Heights, MN (US)

(72) Inventors: Hans Steege, Minneapolis, MN (US); Rolf Scholtz, Minneapolis, MN (US); Colin Klotzbach, West St. Paul, MN (US); Mark Skoine, Minneapolis, MN (US)

(73) Assignee: EVERLAST CLIMBING INDUSTRIES, INC., Chattanooga, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 14/600,650

(22) Filed: Jan. 20, 2015

(65) Prior Publication Data

US 2015/0137947 A1 May 21, 2015

Related U.S. Application Data

(63) Continuation of application No. 12/766,521, filed on Apr. 23, 2010, now Pat. No. 8,952,786.

(Continued)

(51) Int. Cl.
*G06K 7/10* (2006.01)
*G07B 15/06* (2011.01)
(Continued)

(52) U.S. Cl.
CPC ....... *G06K 7/10366* (2013.01); *G07B 15/063* (2013.01); *G08G 1/015* (2013.01); *G08G 1/20* (2013.01); *H04Q 9/00* (2013.01); *H04W 4/02* (2013.01); *G06Q 30/02* (2013.01); *G06Q 30/0269* (2013.01); *G06Q 50/30* (2013.01); *G08B 1/08* (2013.01)

(58) Field of Classification Search
None
See application file for complete search history.

(56) References Cited

U.S. PATENT DOCUMENTS 6,232,877 B1 * 5/2001 Ashwin .................. G06K 17/00
    235/384
7,937,298 B2 * 5/2011 Shah .................... G06Q 10/087
    235/376

(Continued)

*Primary Examiner* — Mohamed Barakat
(74) *Attorney, Agent, or Firm* — McAndrews, Held & Malloy, Ltd.

(57) ABSTRACT

A method for tracking non-motorized vehicle commuting activity includes providing a tracking system having a tag reader at a commute destination, wherein the tag reader is adapted to detect the presence of an RFID tag, and to generate and transmit a detection signal indicating a time of detection and one or more attributes of the detected RFID tag. The RFID tag is secured to a non-motorized vehicle used in commuting to the commute destination, and is secured in a manner to enable detection by the tag reader at the commute destination, and to prevent tampering therewith. Information obtained by the tracking system is accessible by one or more of a system administrator and a commuting participant.

19 Claims, 5 Drawing Sheets

Related U.S. Application Data

(60) Provisional application No. 61/172,024, filed on Apr. 23, 2009.

(51) Int. Cl.
| | |
|---|---|
| *H04W 4/02* | (2009.01) |
| *G08G 1/015* | (2006.01) |
| *G08G 1/00* | (2006.01) |
| *H04Q 9/00* | (2006.01) |
| G06Q 50/30 | (2012.01) |
| G06Q 30/02 | (2012.01) |
| G08B 1/08 | (2006.01) |

(56) References Cited

U.S. PATENT DOCUMENTS

| | | | |
|---|---|---|---|
| 2007/0273518 A1* | 11/2007 | Lupoli | G06Q 10/08 340/572.1 |
| 2008/0014908 A1* | 1/2008 | Vasant | G08G 1/005 455/414.1 |
| 2008/0126207 A1* | 5/2008 | Brown | G06Q 30/0239 705/14.39 |
| 2009/0018902 A1* | 1/2009 | Miller | G06Q 50/30 705/13 |
| 2010/0250727 A1* | 9/2010 | King | G01S 5/0027 709/224 |

* cited by examiner

SYSTEM FOR TRACKING BICYCLE COMMUTER ACTIVITY

CLAIM OF PRIORITY

This application is a continuation of U.S. Nonprovisional patent application Ser. No. 12/766,521, filed on Apr. 23, 2010, which issued on Feb. 10, 2015 as U.S. Pat. No. 8,952,786, and which claims priority to U.S. Provisional Patent Application Ser. No. 61/172,024, filed on Apr. 23, 2009 and entitled "System for Tracking Bicycle Commuter Activity," the content of which being incorporated herein in its entirety.

FIELD OF THE INVENTION

The present invention relates to methods for promoting non-motorized vehicle commuting generally, and more particularly to a system and method for tracking non-motorized vehicle commuter activity, wherein non-motorized vehicles may be tracked for their usage in commuting, for example, to a location of occupation.

BACKGROUND OF THE INVENTION

Motor vehicle congestion upon roadways has become a growing concern for community planners and governmental transportation agencies. Roadway congestion leads to higher accident rates, increased pollutant emissions, and reduced human productivity as a result of extended driving times. Roadway congestion is most pronounced at typical commuting times, such as in the mornings and evenings.

Various solutions have been proposed to reduce roadway congestion. For example, governmental agencies have proposed "staggered" work hours for employees so as to spread out commuting traffic over a longer period of time. Roadway capacity is continually being increased, though at a slower rate than the increase in motor vehicle traffic over time. Mass transit solutions are also being explored, though current capacity and participation are insufficient to unilaterally mitigate motor vehicle congestion problems.

For urban area motor vehicle congestion, an additional helpful solution may be an increased participation in non-motor vehicle commuting. Increased participation in this mode of transportation would obviously mitigate problems associated with motor vehicle congestion. Urban areas have recently dedicated portions of current roadways, and have constructed new pathways for non-motor vehicle transportation in an effort to simultaneously encourage non-motor vehicle transportation, and to discourage motor vehicle transportation. Businesses have also increased the presence of parking areas and locking structures for non-motor vehicles, such as bicycles, to facilitate their use.

Recently, the U.S. federal government has enacted a law providing monetary incentive for commuting by bicycle. The Bicycle Commuter Act was signed into law on Oct. 3, 2008. This legislation allows employers to give employees who commute by bike a monthly tax-free stipend of up to $20.00. Employers may therefore begin to reimburse employees tax-free for bicycle commuting. There may also be health insurance reimbursement opportunities as well for participants in the program.

Businesses and organizations may have other programs to encourage non-motor vehicle commuting. However, verification of compliance with non-motor vehicle commuter incentive programs has traditionally been a challenge, particularly for larger organizations. Consequently, the proliferation of bicycle commuting incentive programs has been subdued.

In view of the above, there is a need to provide a system and method for tracking participation in non-motor vehicle commuting incentive programs. In particular, a need exists for an automated system and method for efficiently tracking non-motor vehicle commuting patterns, as well as an efficient mechanism for determining participant compliance with program award thresholds.

It is therefore an object of the present invention to provide a system and method for tracking non-motorized vehicle commuting activity in an automated and efficient manner.

It is another object of the present invention to provide a simple and unobtrusive apparatus for facilitating the tracking of non-motorized vehicle commuting activity.

SUMMARY OF THE INVENTION

By means of the present invention, non-motorized vehicle commuting activity may be automatically monitored and archived in electronic media. Non-motorized vehicle commuter activity may accordingly be tracked and analyzed on a per participant and/or per group basis. Participating individuals or groups may therefore be graded upon their respective non-motor vehicle commuting performance, and may also review their own information.

In one embodiment, a method for tracking non-motorized vehicle commuting activity includes providing a tracking system having a tag reader at a commute destination, wherein the tag reader is adapted to detect the presence of an RFID tag, and to generate and transmit a detection signal indicating a time of detection and one or more attributes of the detected RFID tag. The tracking system further includes a computing device communicatively coupled to the tag reader and including a data processor, and a database communicatively coupled to the computing device, and including registration information and participant logs. The tracking system also includes a terminal that is communicatively coupled to the database. The method then provides for registering the RFID tag into the database by inputting the one or more RFID tag attributes into the database and associating such attributes with the RFID tag and with the participant within the database. The participant information is then inputted into the participant log.

The tracking method further includes securing the RFID tag to a non-motorized vehicle that is used in commuting to the commute destination, and detecting the RFID tag when the non-motorized vehicle is moved to the commute destination within a detection range of the tag reader. The detection of the RFID tag is recorded by matching one or more attributes of the detection signal to one or more respective attributes stored in the database, retrieving an identity of a participant associated with the matched attributes, and updating the respective participant log with detection information. Additionally, the method includes periodically tabulating the detection information for the participant, including tabulating a number of detections within a defined period.

DETAILED DESCRIPTION OF THE PREFERRED EMBODIMENTS

For the purposes of this invention, the term "non-motorized vehicle" inclusively means a variety of modes of transportation other than an automobile, including some vehicles which may have a motor, but are deemed by the administrators of the system of the present invention to qualify for their incentive program. Example "non-motorized vehicles" may include bicycles, scooters, Segways®, mopeds, and the like. The term "bicycle" as used herein is intended to be inclusive, and not exclusive of the various non-motorized vehicles contemplated by the present invention.

Figure 1:
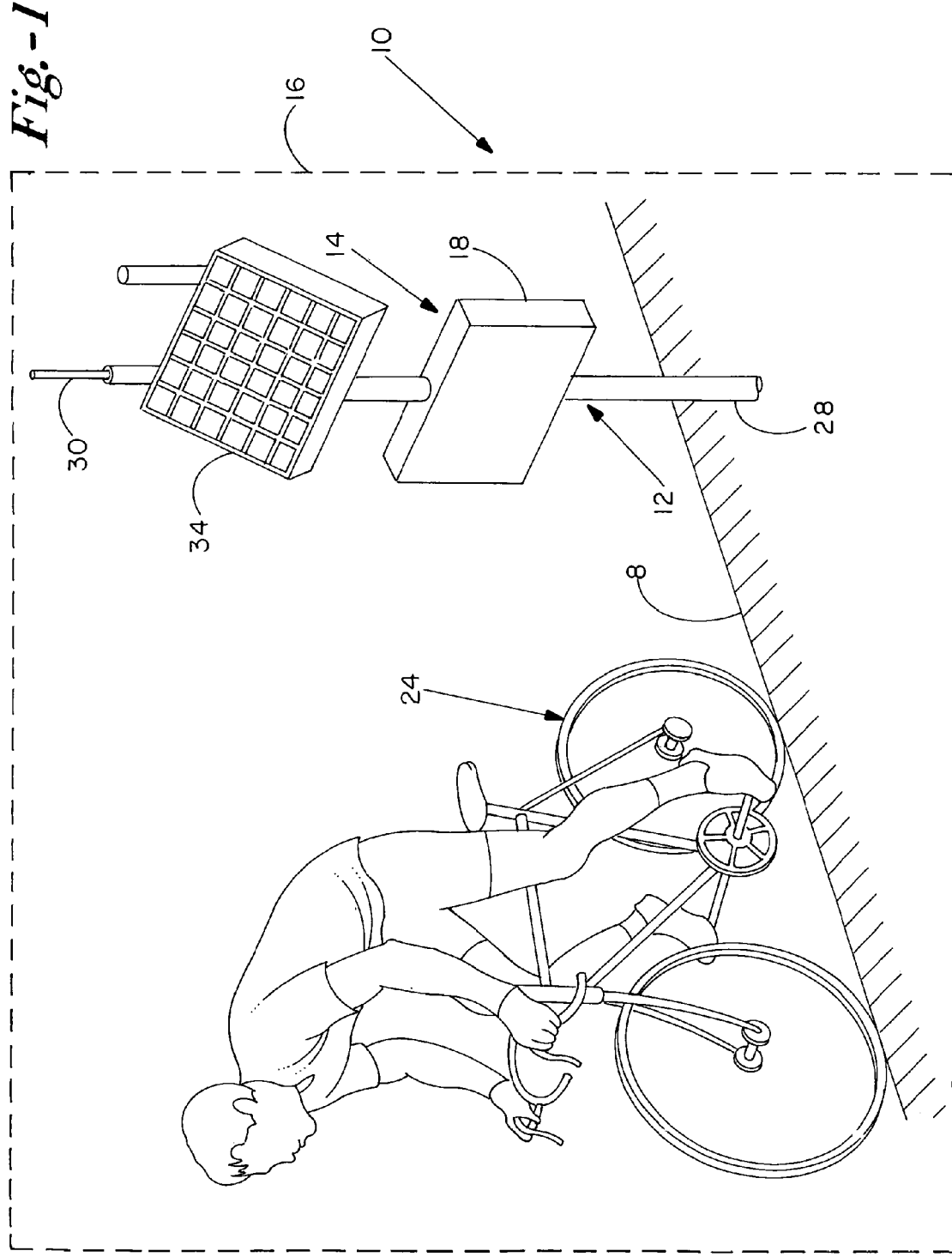
FIG. 1 is a schematic view of a non-motorized vehicle commuting tracking system of the present invention.
Figure 2:
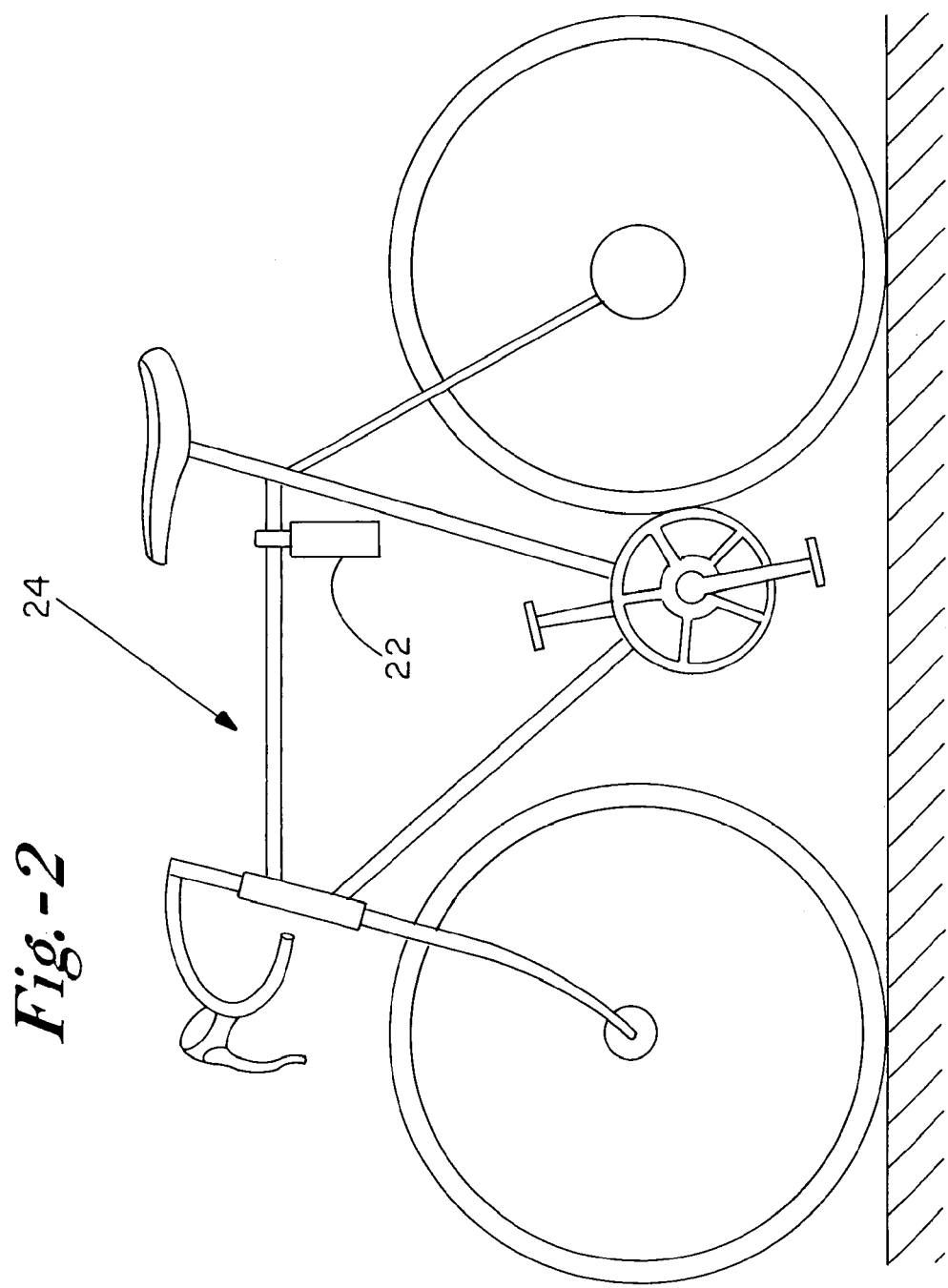
FIG. 2 is an illustration of a non-motorized vehicle with an RFID tag secured thereto.

With reference now to the drawing figures, and first to FIG. 1, a tracking system 10 of the present invention includes a tag reader apparatus 12 having a tag reader 14 adapted to detect the presence of an identification device, such as a radio frequency identification (RFID) tag, within a detection range 16 of tag reader 14. In particular, tag reader 14 may be adapted to generate and transmit a detection signal indicating a time of detection of the RFID tag, and one or more attributes of the detected RFID tag. The detection signal may be transmitted to a computing device 18 that may be communicatively coupled to tag reader 14.

For the tracking of non-motorized vehicle commuting activity, tag reader apparatus 12 may be located at a commute destination 8, such as at or near a place of work for the participant. In some embodiments, tracking system 10 may include a plurality of tag reader apparatus 12 distributed at various locations defining the commute destination 8. For example, an entity administrating tracking system 10 of the present invention may have a large and/or dispersed physical location to which its program participants may commute. Depending upon the detection range 16 of tag reader 14, therefore, a plurality of tag reader apparatus 12 may be desired to effectively cover the areas in which the administrating entity anticipates commuting activity to take place. In some embodiments, tag reader apparatus 12 may be located at, for example, a parking area at commute destination 8, whereby RFID tags 22 secured to a non-motorized vehicle 24 may be detected by tag reader 14 upon arrival at commute destination 8.

Tag reader apparatus 12 may include a stand 28 to which tag reader 14 may be secured. Stand 28 may be secured to a ground surface, as in the illustrated embodiment, but may instead be secured to any other surface, such as a wall or the like. In some embodiments, stand 28 is self-supporting, and is not secured to a ground or wall surface, whereby tag reader apparatus 12 may be portable and selectively moved to desired locations. Dimensions for stand 28 vary, depending upon the application, and the specific instrumentation utilized in tracking system 10. Accordingly, stand 28 may comprise a pole extending at least about 6 feet from the ground surface, or may instead take on a variety of configurations and dimensions.

Tag reader 14 may include a conventional RFID reader device that is used to interrogate RFID tag 22. In the embodiment illustrated in FIG. 1, tag reader 14 includes one or more antennae 30 that emit radio waves to which RFID tag 22 responds by sending back its data. Communication between tag reader 14 and RFID tag 22 occurs wirelessly. In some embodiments, the communication does not require a line of sight between the devices. Tag reader 14 may include a module comprised of a transmitter and receiver, a control unit, and an antenna 30. Tag reader 14 typically has three primary functions: energizing, demodulating, and decoding. In addition, tag reader 14 may include an additional interface that converts the radio waves returned from RFID tag 22 into a data communication format that can be passed onto another system, such as computing device 18 for interpreting and acting upon detection signals transmitted from tag reader 14. It is contemplated that those of ordinary skill in the art readily understand tag reader 14 of tag reader apparatus 12, and its implementation in tracking system 10 to detect the presence of RFID tag 22 within detection range 16.

RFID tag 22 may also comprise a conventional radio frequency identification transponder made up of a microchip and an antenna. RFID tag 22 may be a passive tag or an active tag, as is well understood in the art. RFID tag 22 may be secured to non-motorized vehicle 24 through a variety of mechanisms. In one embodiment, RFID tag 22 may be a tamper evident World Tag available from SkyRFID of Toronto, Ontario, Canada. Such a tag utilizes a strap which may be secured about a portion of non-motorized vehicle 24 in such a manner so as to evidence efforts to remove RFID tag 22 from non-motorized vehicle 24. Other designs and configurations for RFID tag 22, including designs and configurations to frustrate removal of RFID tag 22 from non-motorized vehicle 24 are contemplated by the present invention.

Figure 4:
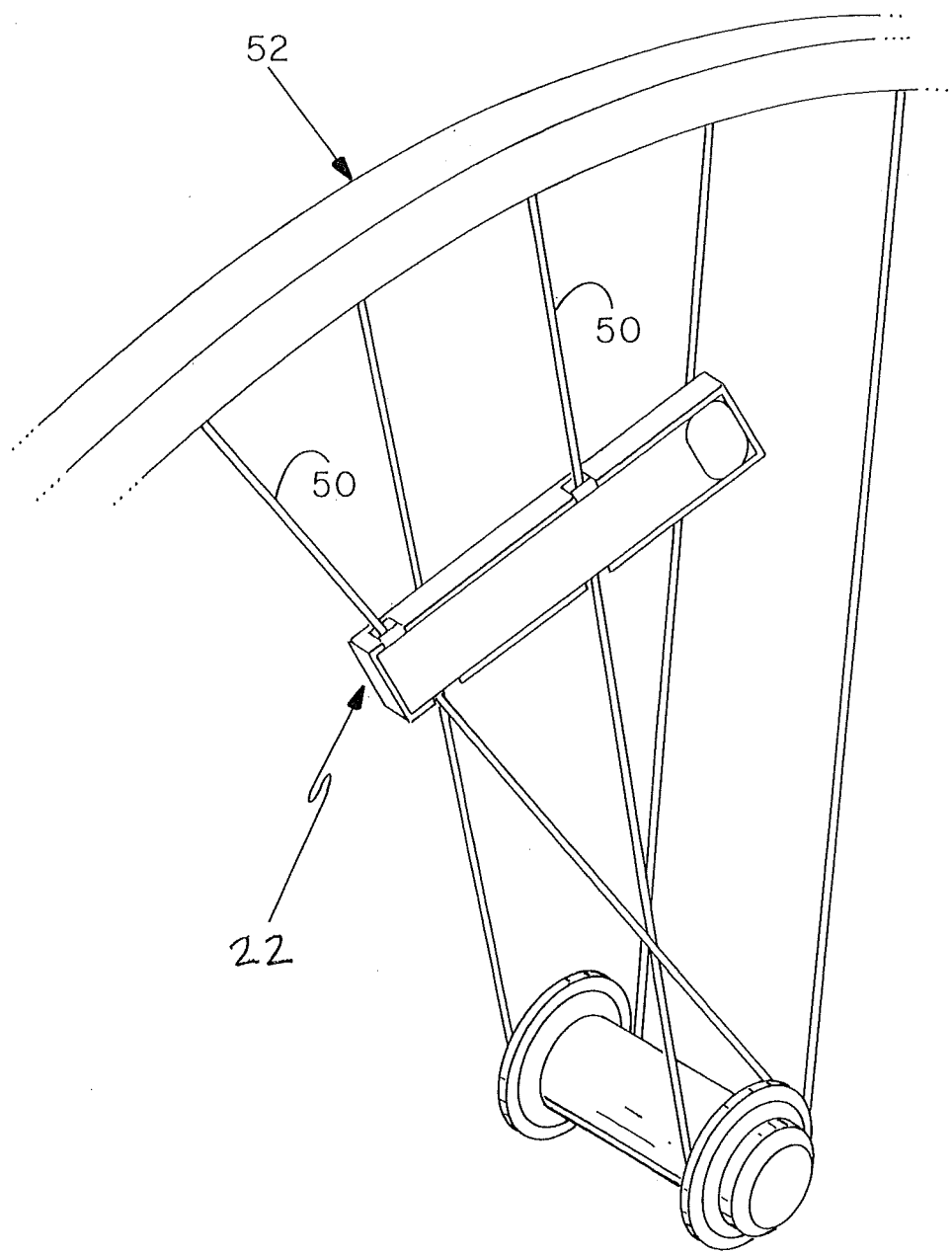
FIG. 4 is an illustration of a non-motorized vehicle with an RFID tag secured thereto.
Figure 5:
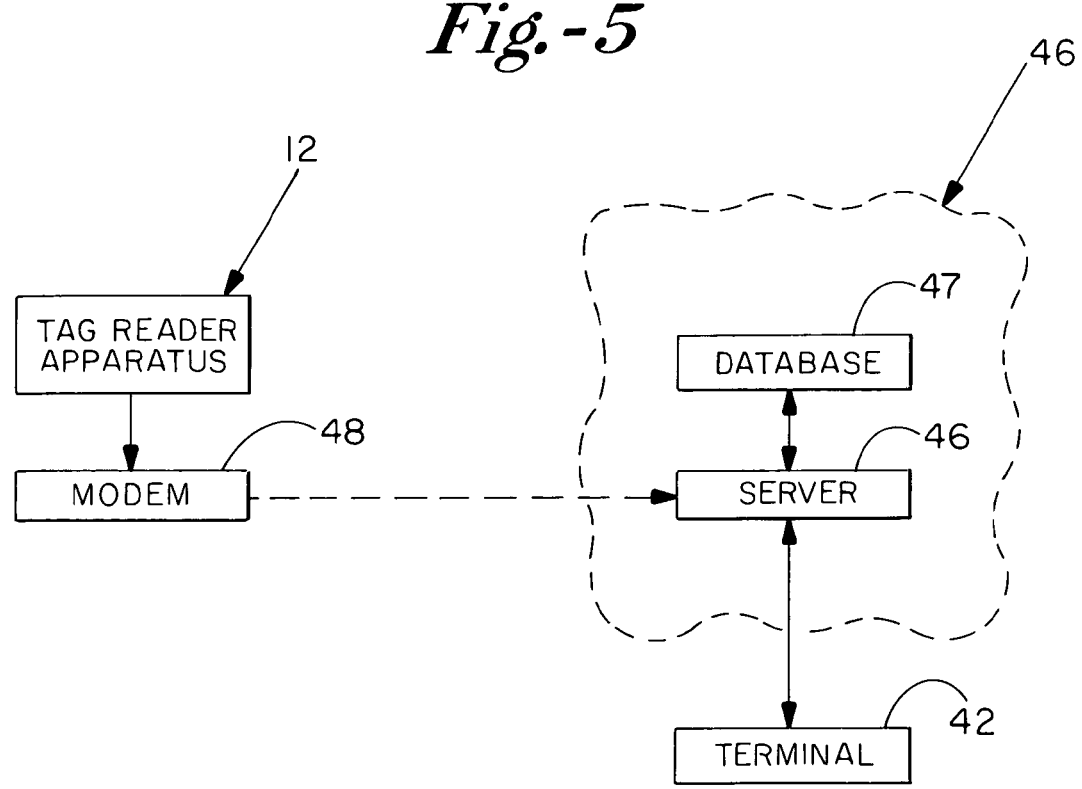
FIG. 5 is a schematic diagram of a non-motorized vehicle commuting tracking system of the present invention.

An example alternative for RFID tag 22 is illustrated at FIG. 4, and is described in our co-pending application Ser. No. 12/652,122 filed on Jan. 5, 2010 and entitled "Tamper Sensitive RFID Tag," the content of which being incorporated herein by reference. In the illustrated embodiment, RFID tag 22 may be secured to and about portions of spokes 50 of the bicycle wheel 52. In this application, a method for securing RFID tag 22 to a bicycle includes positioning one or more spokes 50 of spoke wheel 52 in respective channels of RFID tag 22.

Detection range 16 of tag reader 14 may vary, depending upon the power of the unit employed, the particular RFID tags 22 utilized, the frequencies employed, and the particular characteristics of commute destination 8. In some embodiments, however, detection range 16 may be up to about a 50 foot spherical radius from tag reader 14. In other embodiments, a larger detection range 16 may be achieved if necessary. For example, communication techniques other than RFID may be utilized in the present invention. Therefore, it is contemplated that detection range 16 may be adjusted to meet the parameters of a particular application, including through the use of technology other than RFID.

Upon entry of RFID tag 22 into detection range 16, tag reader 14 initiates and/or receives a radio frequency signal from RFID tag 22. The signal transmitted from RFID tag 22 exhibits specific characteristics indicative of that particular RFID tag 22. For example, each RFID tag 22 utilized in tracking system 10 may transmit a signal of unique frequency within the radio frequency spectrum. An RFID signal received at antennae 30 of tag reader apparatus 12 may result in tag reader 14 generating and transmitting a detection signal to computing device 18. The detection signal may be coded to indicate various information about a received RFID signal, including, for example, time of detection, and one or more attributes of the particular detected RFID tag 22. The detection signal is then received and processed by computing device 18.

In the embodiment illustrated in FIG. 1, computing device 18 may be positioned at tag reader apparatus 12 for local interpretation of the detection signal transmitted from tag reader 14. In this arrangement, therefore, a data processor of computing device 18 interprets the detection signal to identify the detected RFID card 22. Such identification is accomplished through a software program controlling a data processor to scan a database of registration information and participant logs to find a match to the RFID signal characteristics coded within the detection signal. Computing device 18, as illustrated in FIG. 1 may be communicatively coupled to one or more terminals locally or remotely positioned with respect to tag reader apparatus 12. In one embodiment, computing device 18 may be communicatively coupled to the terminal through a computer network, such as the Internet. A software interface, such as an Internet website may be provided to communicate from terminal 42 to computing device 18. In some embodiments, communication between terminal 42 and computing device 18 may be routed through a server, which may be wired or wirelessly communicatively to coupled to computing device 18.

In another embodiment, computing device 18 may be positioned remotely from tag reader 14, and not coupled to stand 28. In such embodiments, tag reader 14 may be communicatively coupled to computing device 18 through a wired or wireless connection.

Data received at tag reader apparatus 12 may be transmitted to a data processing means, such as a server 44 communicatively coupled to a data communication network 46, such as the internet. To do so, tag reader apparatus 12 may or may not include a computing device 18. Communication between tag reader apparatus 12 and a respective data processing device 44 may be accomplished through one or more of a plurality of known mechanisms. For example, data communication may be established through a local areal network (LAN) wired or wireless router which is itself communicatively coupled to the data processing device 44. In other embodiments, data communication may be established wirelessly across cellular phone frequencies, and utilizing existing cellular phone network infrastructure for wide area coverage. In this embodiment, a modem 48 may be provided at tag reader apparatus 12 for transmitting analog and/or digital data at one or more predefined frequencies between 800 and 2000 MHz at known frequency spacing consistent with cellular phone transmission standards. Such an embodiment may utilize existing communication network infrastructure of cellular phone systems to increase transmission distance and area coverage.

In many embodiments, wireless data communication from tag reader apparatus 12 is provided with a specific destination address for routing to a specified data processing device 44, such as terminal 42 and/or a data processing server 44, each of which preferably being communicatively coupled to a database 47 containing data associated with detected RFID tags 22. In some embodiments, computing device 18 is equivalent to server 44, in that reference herein to computing device 18 may also or instead refer to server 44.

In some embodiments of the invention, tag reader apparatus 12 may be powered through one or more solar cells 34 positioned at stand 28. The combination of wireless communicative connectivity and the solar cell energy source for tag reader apparatus 12 enables tag reader apparatus 12 to be self-sufficient, and does not require significant infrastructure modifications to actively deploy tracking system 10. Accordingly, tracking system 10 may be employed with relatively little investment. Instead or in addition to solar cells 34, tag reader apparatus 12 may be powered by batteries or through hard wire connection to the available electrical grid. In some cases, tag reader apparatus 12 may employ a plurality of distinct power sources in order to have access to back-up power supply in the event of primary power supply failure.

Figure 3:
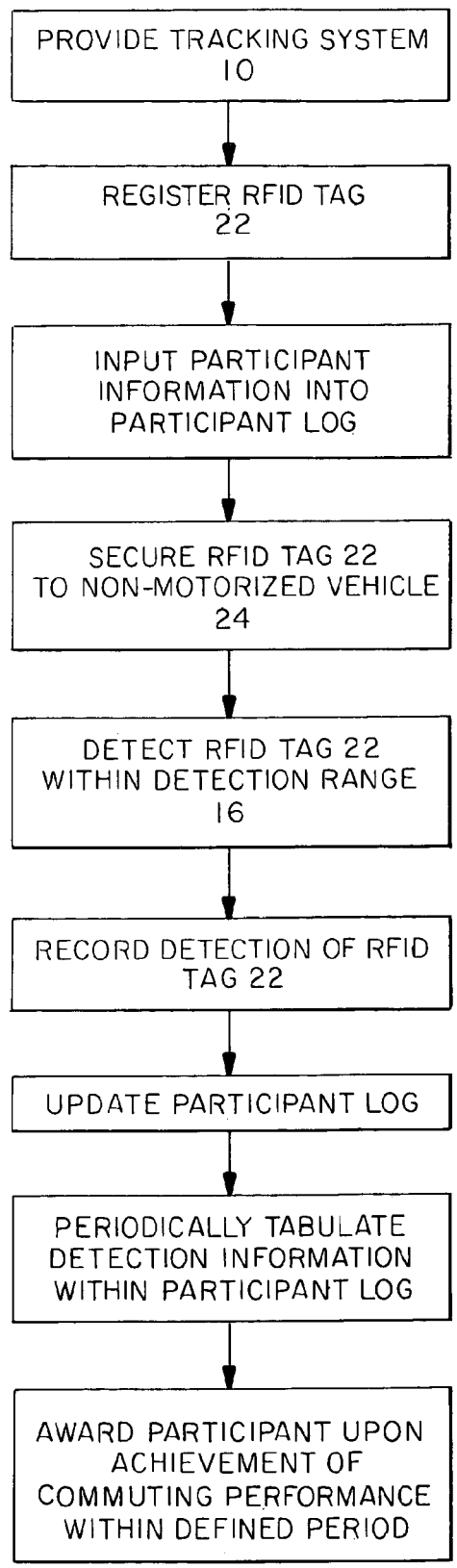
FIG. 3 is a flow diagram illustrating a method for tracking non-motorized vehicle commuting activity.

As depicted in the flow diagram of FIG. 3, a method for tracking non-motorized vehicle commuting activity includes providing tracking system 10 having a tag reader 14 and a computing device 18 as described herein. An RFID tag 22 is then registered into computing device 18 by inputting one or more RFID tag attributes into a database associated with computing device 18, and associating the attributes with RFID tag 22 and with a participant of the program. An example RFID tag attribute may be the specific frequency at which RFID tag 22 emits an RFID signal that may be detected by tag reader 14. Because a specific RFID tag 22 may be distributed to each participant of the commuting program of the present invention, each participant may be associated with the distinct attributes of the specific RFID tag 22. Accordingly, the participant, such as the participant name, identification number, and the like may be associated with the one or more RFID tag attributes in the database of computing device 18.

The participant information is then inputted into the participant log, which represents an associative database containing commuting information about such participant. The participant log may be automatically updated with new commuting information, including dates and times of successful commutes to commute destination 8, upon matching by computing device 18 of an RFID signal from that participant's associated RFID tag 22. In some embodiments, the participant log maintains a record of, for example, dates and times of non-motor vehicle commutes to commute destination 8. Such information within the participant log may be utilized by the system administrators to track and verify commuting activity by the participants, and to determine appropriate awards for meeting predetermined commuting performance thresholds.

RFID tag 22 may be secured to a non-motorized vehicle 24 that is used by the participant in commuting to commute destination 8. The securement of RFID tag 22 may be accomplished through a variety of mechanisms, including the system described in our co-pending application Ser. No. 12/652,122.

In use, the RFID tag 22 secured to the non-motorized vehicle 24 may be detected when non-motorized vehicle 24 is moved to commute destination 8 within detection range 16 of tag reader 14. The detection of RFID tag 22 at the commute destination 8 may be recorded by matching one or more attributes of the detection signal issued by tag reader 14 to one or more respective attributes stored in the database 47. The participant identity associated with the matched RFID tag attributes is retrieved from the database 47, such that a computing device (i.e. server 44) may update the respective participant log with the detection information. The detection information may then be periodically tabulated for tracking and verification purposes. In one embodiment, a system administrator may tabulate a number of RFID tag detections within a defined period, such as a month. Upon achievement of a predetermined minimum number of detections within the defined period, the system administrator may authorize and/or distribute an award to the participant for achieving certain commuting performance within the defined period. For example, the system administrator may provide the participant with a monetary award pursuant to the Bicycle Commuter Act upon verification of a predetermined commuting performance registered by tracking system 10.

In some embodiments of the present invention, participants and/or system administrators may access information within the database 47 through one or more terminals 42 communicatively coupled to computing device 18 (including server 44), such as through a computer network 46. Such access may be facilitated by a software application such as a network website, so that a computing device 18 coupled to terminal 42 through a computer network may be remotely accessed from any terminal 42 having access to the computer network. The website may provide a convenient graphical user interface for reviewing information relevant to tracking system 10, including participant commuting performance, award information, and the like.

The website may be programmed with software to provide various information to a commuter and/or a system administrator. For example, the software may be programmed to retrieve, analyze, format, and/or communicate data from the database 47 to the website in desired format for presenting information to the user and/or system administrator. Example information which may be supplied by the software system of the present invention includes commuting reports which indicate periodic commuting performance of individual or grouped users across specified date ranges, aggregate commuting performance and statistics for designated groups of users having one or more respective participants, and commuting performance relative to a specific designated commute location, including numbers of participants commuting on a periodic or specified date rage basis. The software system may further provide a "dashboard" in which certain statistics and operational information of the system of the present invention may be displayed at a single location and at a convenient format at the graphical user interface of the website.

In one embodiment, the system of the present invention may incorporate awards, such as monetary awards, to participants upon exceeding one or more commuting performance thresholds. For example, the system administrator may monitor the website associated with the system database 47 for tracking participant commuter activity. Upon meeting or exceeding a pre-defined commuting performance threshold, a participant may be awarded by the system administrator, including in the form of a monetary award. In one embodiment, for example, a participant may receive a monetary award in exchange for commuting at least a predetermined number of times in a given period, such as within a month. The system administrator may further assign a plurality of thresholds with various awards, including increasing awards with participant accomplishment of one or more performance thresholds within a predetermined period of time.

In some embodiments, tag reader apparatus 12 may emit an audible and/or visible signal when an RFID tag 22 enters into detection range 16. As a result, the commuter is made aware when tag reader apparatus 12 has detected the presence of their associated RFID tag 22.

The invention has been described herein in considerable detail in order to comply with the patent statutes, and to provide those skilled in the art with the information needed to apply the novel principles and to construct and use the invention as required. However, it is to be understood that the invention may be carried out by different devices, and that various modifications may be accomplished without departing from the scope of the invention itself.

What is claimed:

1. A method for tracking commuting activity of an employee, the employee being associated with a non-motorized vehicle to which an RFID tag is secured, the method comprising:
    (a) an employer providing a tracking system having:
        (i) a tag reader at a location of occupation of an employee, the tag reader being adapted to detect the presence of a RFID tag and to transmit a detection signal indicating one or more attributes of the detected RFID tag;
        (ii) a computing device having a data processor and being communicatively coupled to the tag reader; and
        (iii) a database communicatively coupled to the computing device, the one or more RFID tag attributes being stored in the database and associated with an employee log maintained by the employer;
    (b) detecting the RFID tag when the non-motorized vehicle is moved to the location of occupation;
    (c) recording a detection of the RFID tag by matching one or more attributes of the detection signal to one or more attributes stored in the database and updating the employee log with detection information; and
    (d) the employer rewarding the employee when the employee exceeds one or more commuting performance thresholds, the one or more commuting performance thresholds comprising a number of non-motorized vehicle commutes.

2. The method of claim 1, in which the detection information comprises the date and time of detection.

3. The method of claim 1, in which the database is communicatively coupled to one or more terminals such that information within the database may be accessed through the one or more terminals.

4. The method of claim 3, in which the one or more terminals are communicatively coupled to the database through a computer network.

5. The method of claim 3, in which the one or more terminals are communicatively coupled to the database through the Internet.

6. The method of claim 5, in which a website provides a user interface for a user to review information within the database.

7. The method of claim 3, the tracking system further comprising software that formats information accessed from the database.

8. The method of claim 7, in which the software produces a commuting report.

9. The method of claim 8, in which the commuting report indicates periodic commuting performance of individual or grouped users.

10. The method of claim 8, in which the commuting report indicates aggregate commuting performance for designated groups of users having one or more respective employees.

11. The method of claim 8, in which the commuting report indicates commuting performance relative to a specific designated commute location.

12. The method of claim 7, in which the software provides a dashboard containing statistics, system operational information, or both.

13. The method of claim 3, in which information within the database may be accessed by the employee.

14. The method of claim 13, in which the information that may be accessed by the employee includes the detection information from the employee's own log, information relating to the employee's own commuting performance, or both.

15. The method of claim 1, wherein upon detecting an RFID tag, the tag reader emits a signal indicating to the employee that the tag reader has detected the RFID tag.

16. The method of claim 1, wherein the non-motorized vehicle is a bicycle.

17. The method of claim 1, wherein the RFID tag has tamper resistant properties.

18. The method of claim 1, wherein the number of non-motorized vehicle commutes is within a defined period.

19. The method of claim 18, wherein the defined period is a month.

* * * * *